United States Patent [19]

Alexander et al.

[11] Patent Number: 4,798,099
[45] Date of Patent: Jan. 17, 1989

[54] CONTROL MECHANISM FOR OPERATING A VEHICLE

[75] Inventors: George F. Alexander, Pekin; Alan R. Coutant, Chillicothe; David M. Fee, Groveland; Craig W. Riediger, Pekin, all of Ill.

[73] Assignee: Caterpillar Inc., Peoria, Ill.

[21] Appl. No.: 139,888

[22] Filed: Dec. 30, 1987

[51] Int. Cl.⁴ .......................... B62D 11/04; G05G 9/00
[52] U.S. Cl. ........................... 74/473 R; 74/484 R; 74/487; 180/332; 180/333
[58] Field of Search ............ 74/471 R, 473 R, 473 P, 74/ 479, 480 R, 483 R, 483 PB, 484 R, 486, 487; 180/78, 332, 333, 336; 192/4 R, 4 A, 4 B, 4 C

[56] References Cited

U.S. PATENT DOCUMENTS

| 652,940 | 7/1900 | Whitney | 180/78 |
|---|---|---|---|
| 1,154,653 | 9/1915 | Pattison . | |
| 2,861,465 | 11/1958 | Winkle et al. | 74/473 |
| 3,180,305 | 4/1965 | Gower-Rempel | 180/333 |
| 3,349,860 | 10/1967 | Ross | 180/6.44 |
| 3,417,635 | 12/1968 | Day et al. | 74/484 |
| 3,470,771 | 10/1969 | Houk | 74/473 R |
| 3,480,120 | 11/1969 | Lenzen et al. | 192/4 |
| 3,539,040 | 11/1970 | Edwards | 192/4 |
| 3,621,956 | 11/1971 | Suckow et al. | 192/4 A |
| 3,628,395 | 12/1971 | Maurer | 74/484 R |
| 3,710,904 | 1/1973 | Boyer et al. | 192/4 A |
| 3,729,074 | 4/1973 | Anderson et al. | 192/4 A |
| 3,941,009 | 3/1976 | Brown | 74/473 R |
| 4,158,968 | 6/1979 | Wilson et al. | 192/4 A |
| 4,334,130 | 6/1982 | Beig | 180/336 |
| 4,373,619 | 2/1983 | Schritt et al. | 192/0.09 |
| 4,541,497 | 9/1985 | Riediger et al. | 192/4 C |
| 4,726,262 | 2/1988 | Hayakawa et al. | 74/878 |

Primary Examiner—Lawrence Staab
Attorney, Agent, or Firm—Charles E. Lanchantin, Jr.

[57] ABSTRACT

In order to more easily control movement of a vehicle such as a tractor, an operator's left hand can twist a directional actuating member or a juxtaposed speed actuating member about an outstanding axis. These actuating members are rotatably mounted on a tiller arm extending radially from a housing assembly so that the operator can simultaneously use the actuating members and steer the vehicle by pushing or pulling the tiller arm and rotating the housing assembly in the desired direction about an upstanding axis. Push-pull controls are associated with each actuating member and protected within the housing assembly. A bearing assembly guidably supports and permits relative angular movement of each of the push-pull controls to prevent twisting thereof when the housing assembly is rotated.

19 Claims, 6 Drawing Sheets

CONTROL MECHANISM FOR OPERATING A VEHICLE

DESCRIPTION

TECHNICAL FIELD

This invention relates to a mechanism for controlling the movement of a vehicle, and more particularly to a more effective and operationally less fatiguing mechanism for simultaneously steering the vehicle and controlling the direction of longitudinal movement and speed range of the vehicle.

BACKGROUND ART

The control mechanism disclosed in U.S. Pat. No. 4,541,497 to C. W. Riediger, et al on Sept. 17, 1985, and which was specifically constructed for steering and operating the transmission of a track-type vehicle, has been extremely well received by the industry. In such mechanism, a tiller arm extends outwardly from an upstanding member which is rotatable about a fixed axis, and the vehicle is steered as the tiller arm is swung in either direction away from a generally centered neutral position. In order to change at least one of the speed range of the vehicle and the direction of longitudinal movement of the vehicle, a handgrip portion is supported on the tiller arm for rotation about its own axis. Thus, the handgrip portion can be conveniently grasped by an operator's downwardly facing left-hand palm and as the vehicle is traveling forwardly it can be steered to the left by swinging the tiller arm forwardly. Simultaneously, the vehicle can be shifted from a forward to a reverse speed by merely twisting the handgrip portion about its own axis through a relatively limited angular range.

A mechanically separated speed selector lever has heretofore been used with the aforementioned steerable tiller arm and its twistable handgrip portion. This requires the operator to release the tiller arm and grasp the juxtaposed speed selector lever in order to make a speed range shift of the vehicle transmission. Upon completing the range shift, the speed selector lever is released and the left hand returned to the tiller arm. This is not only fatiguing and vexatious, but can delay the operator's attention from other tasks. Normally, the operator's right hand is used extensively for manipulating an implement control lever, and as the operator's left hand passes between the separated control members, there is a slight delay in using the right hand.

In addition, the separated speed selector lever has heretofore been automatically forced back to a neutral position when a separate parking brake handle has been applied. Consequently, when the parking brake is released it is positively assured that the vehicle is in neutral and not in an operating gear. Although the parking brake handle was inconvenient to reach and a relatively complex mechanical connection was used between these control members, it is a desirable feature.

While the control mechanism of aforementioned U.S. Pat. No. 4,541,497 is rugged and reliable, it is relatively complex and costly in construction because of the physically separated operating members and the multiplicity of links and levers associated between each one and the associated selector spools operated thereby.

Thus, what is desired is a simplified and reliable control mechanism for operating a vehicle that includes a swingable tiller arm for steering purposes, as well as integrated actuating members for separately controlling the direction of longitudinal movement of the vehicle and the speed range of the vehicle. The tiller arm and associated actuating members should be so constructed and arranged as to fully take into account the principles of economy of motion of a single hand. Preferably, the improved control mechanism should also include a fully integrated brake actuating member for engaging a parking brake and simultaneously assuring neutralization of the transmission associated with movement of the vehicle.

The present invention is directed to one or more of the problems as set forth above.

DISCLOSURE OF THE INVENTION

In one aspect of the invention a control mechanism for operating a vehicle includes an element mounted for swinging movement about an upstanding first axis, and a tiller arm extending outwardly from the element along a second axis for controlling steering of the vehicle by swinging the element. Advantageously, first and second actuator devices having first and second actuating members respectively arranged on the tiller arm are used for controlling the direction of longitudinal movement of the vehicle and the travel speed range of the vehicle.

In another aspect of the invention, a control mechanism is provided for operating a vehicle including a housing assembly, support means for mounting the housing assembly so that it can swing about an upstanding first axis, a tiller arm extending from the housing assembly along a second axis, a first actuating member connected to the tiller arm that controls the direction of longitudinal movement of the vehicle, and a second actuating member connected to the tiller arm that controls the travel speed range of the vehicle.

In a further aspect of the invention a control mechanism for operating a vehicle includes a housing assembly, first support means for mounting the housing assembly for swinging movement about an upstanding axis, an actuating member, second support means for mounting the actuating member on the housing assembly for limited rotation about a second axis, control means for mechanically changing one of the direction and the speed range of the vehicle, coupling means for connecting the control means to the actuating member, and bearing assembly means for guidably supporting and permitting relative angular movement of the coupling means about a third axis radially offset from the upstanding first axis when the housing assembly is swung.

More particularly, a tiller arm extends outwardly of a housing assembly that is rotatable about an upstanding axis, and the vehicle is steered as the tiller arm is swung in either direction from neutral. A directional actuating member and a speed actuating member are mounted adjacent one another on the tiller arm for limited rotation about a second axis, such that the operator's downwardly facing hand palm can conveniently grasp either of the actuating members to change the direction or speed range of the vehicle while simultaneously steering the vehicle. A parking brake actuating lever is also secured to the upper portion of the swingable housing assembly, and when it is moved to a BRAKE-ON mode a neutralizing member operates to automatically urge the directional actuating member from either of the FORWARD or REVERSE positions to a centrally located NEUTRAL position. This feature prevents movement of the vehicle with the vehicle parking brake engaged, and when the parking brake actuating lever is subsequently moved to the BRAKE-OFF mode, the transmission remains in NEUTRAL rather than in any positive gear drive mode. Furthermore, the control mechanism employs simple and effective push-pull control members within the housing assembly for the individual operation of four hydraulic control valves.

Other aspects and advantages of the present invention will become readily apparent upon reference to the accompanying drawings and the following description.

BEST MODE FOR CARRYING OUT THE INVENTION

Figure 2:
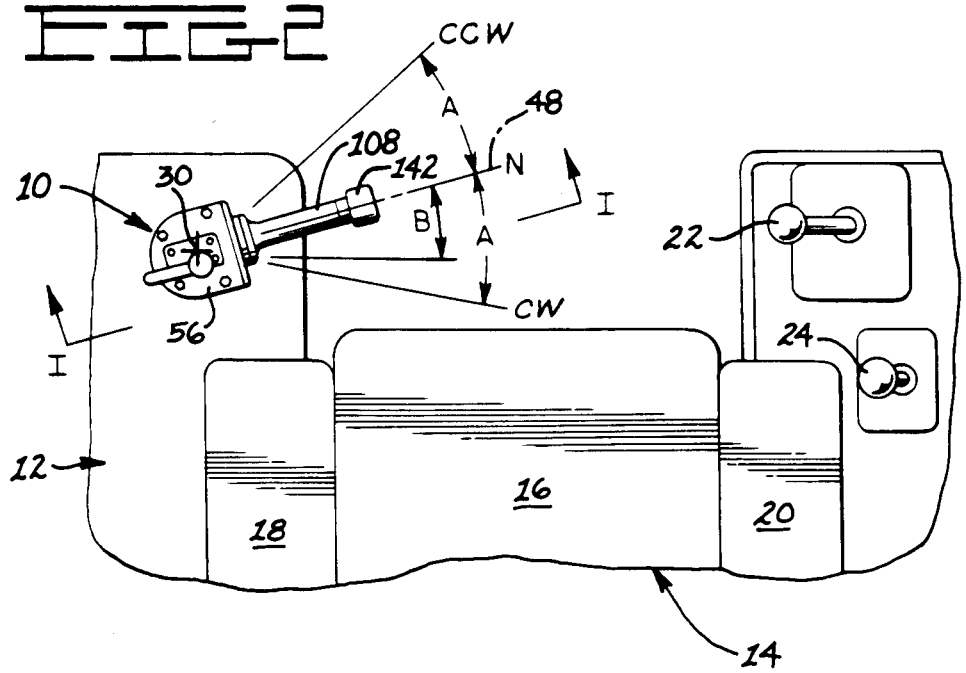
FIG. 2 is a fragmentary, diagrammatic, top plan view of the control mechanism illustrated in FIG. 1 including portions of a vehicle's operating station and various control members in the vicinity of the operator seat.

Referring to FIG. 2, a transmission, steering, and parking brake control mechanism 10 constructed in accordance with the present invention is illustrated in conjunction with an operator station 12 of a track-type vehicle identified generally by the reference number 14. The operator station includes a tractor seat 16 having left and right arm rests 18 and 20, an implement control lever 22, and an auxiliary control lever 24. The control lever 22, for example, is of the joy-stick type for adjusting the elevation and tilt angle of a bulldozer blade mounted on the vehicle. The auxiliary control lever 24 is typically used for operating a ripper or a winch mounted on the tractor. The location and operation of such implements are well known in the art although they are not shown in the drawings. The control levers 22 and 24 are manipulated by the operator's right hand, while the control mechanism 10 is manipulated by the operator's left hand.

Figure 9:
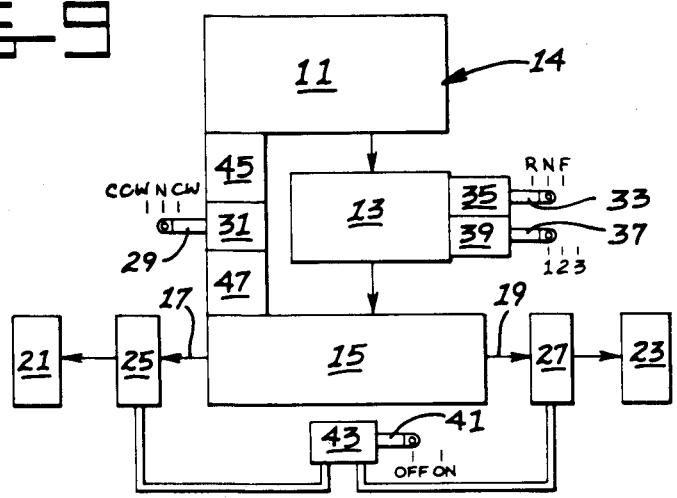
FIG. 9 is a block diagram plan view of the power train of the vehicle with four hydraulic control valves associated therewith which are operated by the control mechanism of FIG. 1.

As is illustrated in FIG. 9, the vehicle 14 also includes an engine or power plant 11 drivingly connected to a power shift transmission 13 having a plurality of forward speeds and a plurality of reverse speeds. The longitudinally oriented transmission powers a cross drive mechanism 15 oriented transversely of the vehicle, which has left and right output members 17 and 19. The output members powerably rotate left and right drive wheels or sprockets 21 and 23, and left and right parking brakes 25 and 27 are operatively connected therewith to inhibit the rotation of the individual drive wheels.

Figure 1:
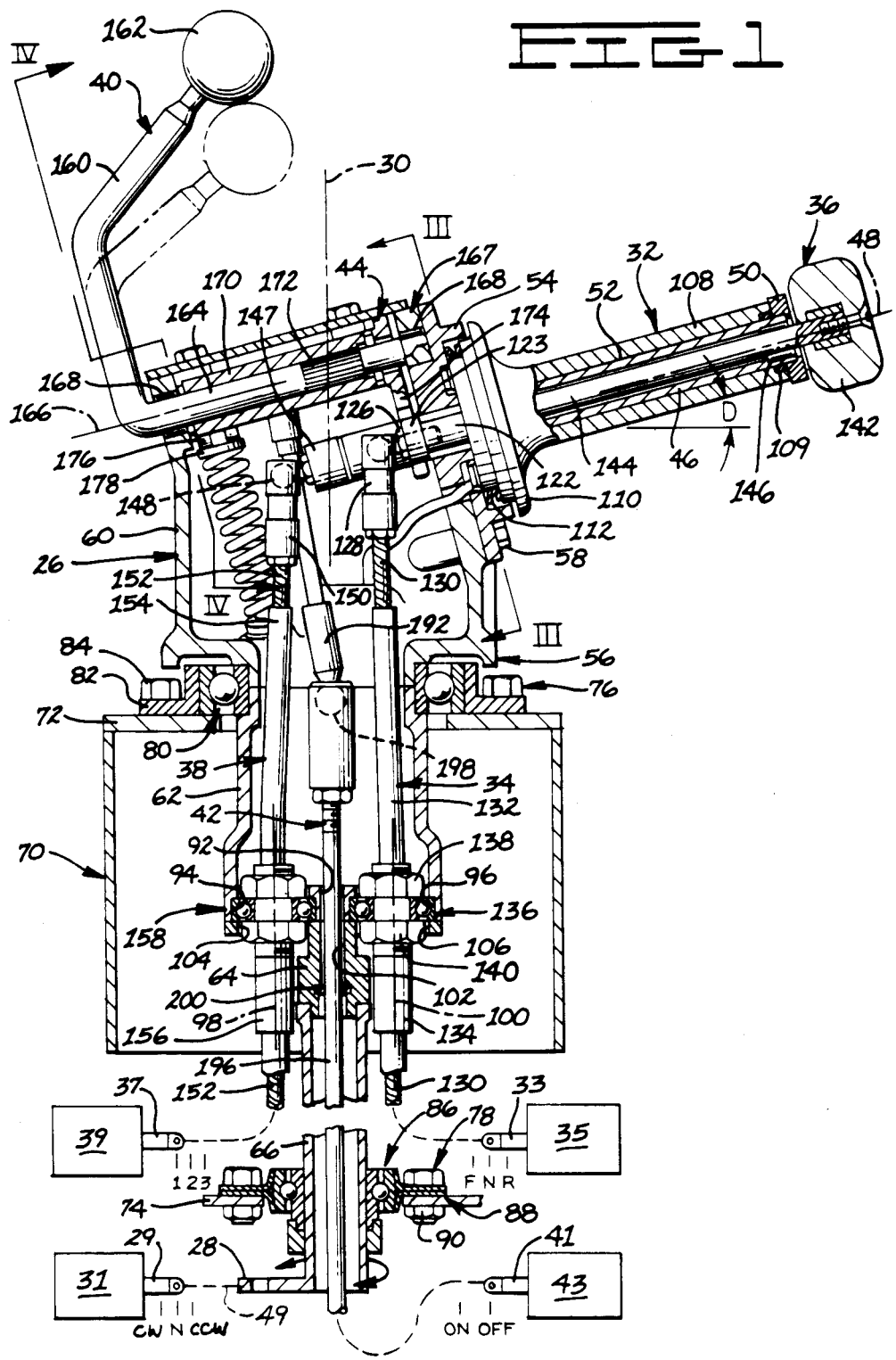
FIG. 1 a diagrammatic, rear elevational view of the control mechanism of the present invention with portions of the housing walls broken away and certain elements illustrated in cross section to better show details of construction thereof.

As is shown in FIG. 1, the control mechanism 10 includes: (a) a steering selector apparatus 26 for steering the vehicle 14 by rotating an elevationally lower output lever arm 28 about a fixed upstanding axis 30; (b) a first actuator device 32 for controlling the direction of longitudinal movement of the vehicle by the generally vertical displacement of a first push-pull control or cable assembly 34; (c) a second actuator device 36 for controlling the speed range of the vehicle by the generally vertical displacement of a second push-pull control or cable assembly 38; and (d) a brake and transmission neutralizer device 40 for simultaneously restricting movement of the vehicle by the generally vertical displacement of a third push-pull control or rod assembly 42 and for urging the first actuator device 32 to a neutral position by the swinging movement of a neutralizing member 44.

The steering selector apparatus 26 includes a steering selector spool 29 which is adapted to be proportionately axially displaced in a first hydraulic control valve 31 to the counterclockwise turn or clockwise turn positions. As can be generally appreciated by reference to FIG. 9, the first hydraulic control valve 31 controls the flow of hydraulic fluid between and engine driven steering pump 45 and a reversible steering motor 47 selectively driving the cross drive mechanism 15. For example, the counterclockwise rotation of the vehicle about its own central vertical axis results in a left turn when traveling forwardly.

The first actuator device 32 includes a directional selector spool 33 which is adapted to be axially displaced in a second hydraulic control valve 35 to either a FORWARD position or a REVERSE position at the opposite sides of a centralized NEUTRAL position as is shown in FIGS. 1 and 9. And, the second actuator device 36 includes a speed selector spool 37 which is axially displaced in a third hydraulic control valve 39 to obtain a preselected one of a plurality of speed range positions such as FIRST GEAR, SECOND GEAR and THIRD GEAR.

The brake and neutralizer device 40 includes a parking brake selector spool 41 which can be axially displaced in a fourth hydraulic control valve 43 between a BRAKE-OFF position and a BRAKE-ON position.

More particularly, the steering selector apparatus 26 includes a tubular tiller arm 46 defining a central outstanding axis 48 which preferably extends upwardly at a slight angle from a horizontal plane as is identified by the letter D in FIG. 1. As is shown in FIG. 2, the central axis 48 extends generally toward the fixed upstanding axis 30 in a slightly offset manner, and when the vehicle 14 is travelling in a straight longitudinal direction, the axis 48 is preferably at a preselected angle B forwardly of a transverse vertical plane through the axis 30.

Figure 5:
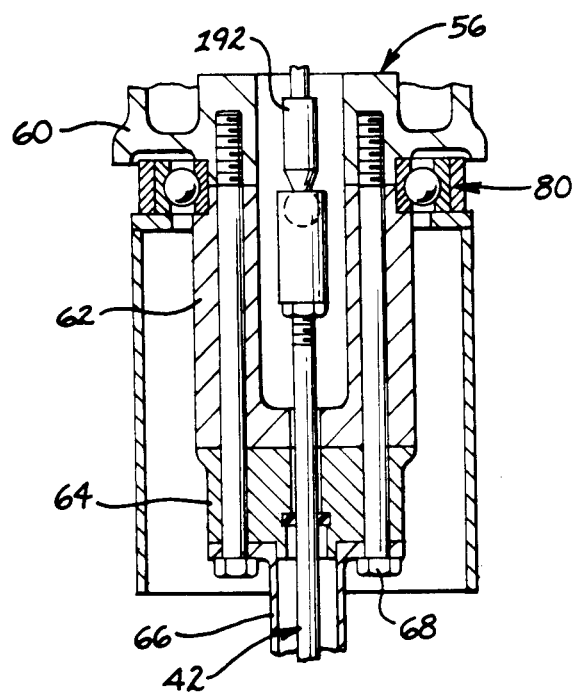
FIG. 5 is a fragmentary, diagrammatic, cross sectional view of the housing supporting structure shown in FIG. 1, only as taken from the left side thereof.

The tubular tiller arm 46 includes a distal end flange 50 and an outer cylindrical surface 52 concentrically arranged along the central axis 48, and is rigidly secured to a supporting pedestal element 54 intermediate the ends thereof. In turn, the pedestal element is releasably secured to a swingable housing assembly 56 by a plurality of threaded fasteners or bolts 58, one of which is illustrated. As is shown in FIGS. 1 and 5, the housing assembly 56 has an upper profiled case 60, an intermediate tubular portion 62, an intermediate adapter portion 64, and a lower tubular portion 66 arranged along the upstanding axis 30 and releasably secured together by a plurality of elongate threaded fasteners or bolts 68. A stationary frame 70 has an upper deck 72 and a lower deck 74, and upper and lower bearing support structure 76 and 78 are provided for mounting the housing assembly 56 for swinging movement about the upright axis 30. The upper bearing support structure 76 includes a ball bearing assembly 80 entrapped between the upper profiled case 60 and the intermediate tubular member 62, and is generally held stationary by an annular retaining member or collar 82 releasably connected to the upper deck 72 as by a plurality of threaded fasteners or bolts 84. The lower bearing support structure 78 is optional, although it is preferred, and in the instant example includes another ball bearing assembly 86 contained within a retaining ring device 88. The retaining ring device 88 is releasably secured to the lower deck 74 as by the threaded fasteners or bolt and nut assemblies 90, and is used to stabilizingly center the lower tubular portion 66 of the housing assembly.

The lower part of the intermediate tubular member 62 defines a central bore 92 on the upstanding axis 30, and a pair of somewhat larger diameter stepped bores 94 and 96 arranged along a diagonally opposite pair of upstanding and offset axes 98 and 100 respectively and which are radially offset the same distance from the central axis 30. The adapter portion 64 has a corresponding central bore 102, and a pair of bores 104 and 106 also arranged along the respective axes 98 and 100.

Figure 7:
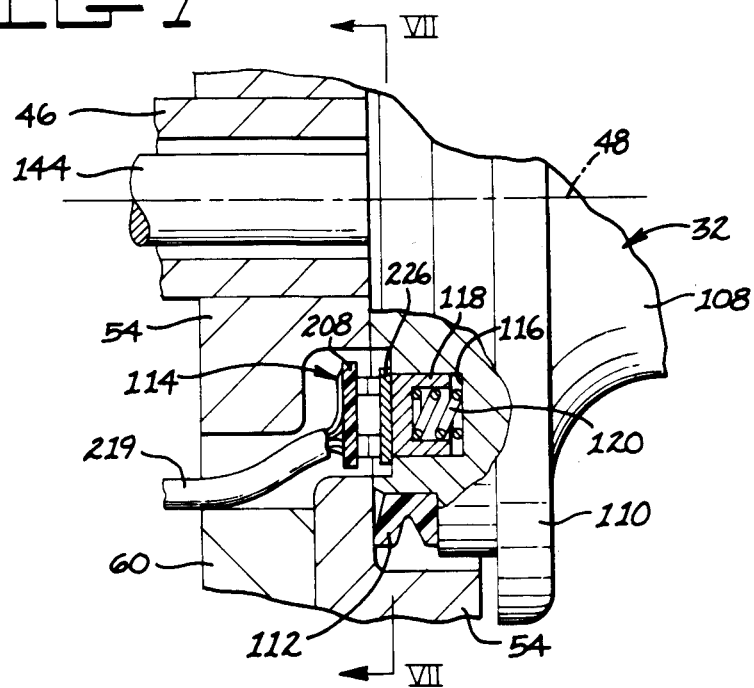
FIG. 7 is an enlarged, fragmentary, diagrammatic cross sectional view of the electrical switch assembly of FIG. 1.

Turning now to the first actuator device 32, it may be noted to include a tubular directional actuating member or first handgrip portion 108 rotatably supported directly by the tiller arm 46. Preferably, the outer cylindrical surface 52 of the tiller arm is hardened and/or coated with a material having a relatively low coefficient of friction to more effectively support the directional actuating member 108. An outer seal ring 109 is located between the directional actuating member 108 and the tiller arm 46 adjacent the distal end flange 50. As best shown in FIG. 7, the directional actuating member has a stepped inner flange 110 and an inner seal ring 112 is seated thereon and engaged with the outer face of the pedestal element 54 of the tiller arm 46. An arcuately-shaped electrical switch assembly 114 is located between the pedestal element 54 and the flange 110 of the directional actuating member and two blind rectangular pockets 116 are defined in the inner flange 110, although only one of which is illustrated. Each of the pockets is adapted to receive a piston 118 therein which is biased to the left when viewing the drawing by a compression spring 120.

Figure 3:
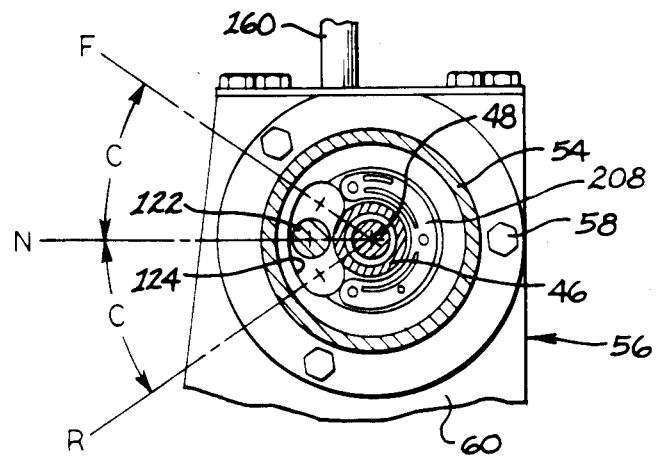
FIG. 3 is a fragmentary, diagrammatic, cross sectional view as taken along line III—III of FIG. 1.

Furthermore, the first actuator device 32 has an inwardly extending cylindrical projection 122 which is illustrated in FIGS. 1 and 3. This projection is rigidly secured to the inner flange 110 of the directional actuating member 108 at a preselected radius from the central axis 48 of the tiller arm 46 and parallel to that axis. A cylindrical ring 123 is fixedly secured to the projection 122, although it can be adapted to freely rotate thereon if desired. The projection extends through an arcuate or kidney-shaped slot 124 defined fully through the pedestal element 54, and at the inner end thereof has a ball assembly 126 releasably secured thereto. The first push-pull cable assembly 34 has at its upper extremity an extendable socket head 128 which receives the ball assembly. Such ball and socket coupling arrangements are quickly connected and disconnected and are widely available. The socket head is connected to a depending cable 130 which is contained within a tubular sheath 132 and an outer protecting wrap 134. The distal end of this cable is connected to the directional selector spool 33.

Advantageously, a first ball bearing assembly 136 is provided for guidably supporting and permitting relative angular movement of the push-pull cable assembly 34 within the housing assembly 56 and about its own offset axis 100 as the housing assembly is limitedly swung about the central upstanding axis 30. The ball bearing assembly is exteriorly seated in the stepped bore 96 of the tubular member 62, and internally seated on the outer protecting wrap 134 such that it guidably centers the protecting wrap and sheath 132. At least a portion of the protecting wrap is threaded so that an upper nut 138 and a lower nut 140 can be screwthreadably adjusted thereon in an entrapping relationship with the inner race of the ball bearing assembly. The outer race thereof is contained by the adapter portion 64 of the housing assembly.

The second actuator device 3 includes a knob-like speed actuating member or second handgrip portion 142 releasably secured to the distal end of an elongate cylindrical shaft 144. A pair of needle bearings or sleeve bearings 146, the outer one of which is shown, rotatably support the opposite ends of the shaft within the tubular tiller arm 46. The proximal end of the shaft has a radius arm 147 with a ball assembly 148 releasably secured thereto. This ball assembly is contained within an extendable socket head 150 connected to the upper end of the second push-pull cable assembly 38. A depending cable 152 is connected to the socket head and is adapted to slide within a tubular sheath 154 and an outer, externally threaded protecting wrap 156 in a manner similar to that described with respect to the push-pull cable assembly 34. A second ball bearing assembly 158 is provided for guidably supporting and permitting relative angular movement of the push-pull cable assembly 38 within the housing assembly 56 about its own offset axis 98 as the housing assembly is limitedly rotated. But since the first and second ball bearing assemblies 136 and 158 are preferably identical, the latter need not be further described.

Figure 4:
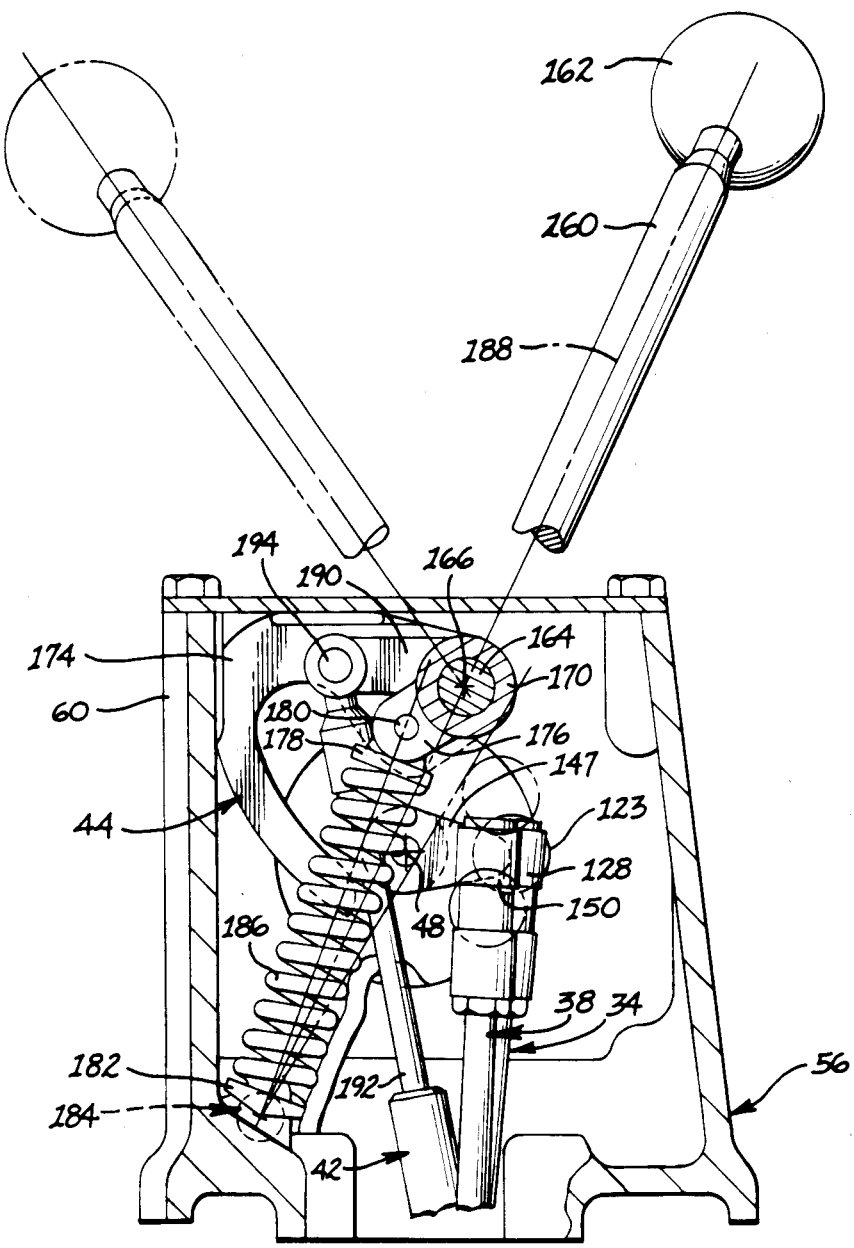
FIG. 4 is an enlarged, fragmentary, diagrammatic, cross sectional view as taken along line IV—IV of FIG. 1.

Attention is now directed to FIGS. 1 and 4 and to the brake and transmission neutralizer device 40 which includes a parking brake actuating member or lever 160 movable between a rearwardly disposed BRAKE-OFF position shown in solid lines and a forwardly disposed BRAKE-ON position shown in phantom lines. The generally U-shaped lever has a spherical knob 162 at the upper end thereof, and a cylindrical mounting portion 164 at the lower end which is mounted for limited rotation about an axis 166 by a support structure 167 including a pair of needle bearings or sleeve bearings 168 seated within the upper profiled case 60. A tubular sleeve 170 is connected to rotate with the mounting portion 164 by a spline joint 172, and has the neutralizing member 44 integrally secured thereto at one end. At the opposite end a pair of lever arms or mounting ears 176 extend integrally therefrom. These ears are connected to an upper spring seat 178 by a pivot pin 180. A lower spring seat 182 is connected to the inner portion of the profiled case 60 by a ball and socket joint identified generally by the reference number 184, and a coiled compression spring 186 extends between the two seats. The pivot pin 180 is located at the upper side of a plane 188 passing through the ball and socket joint and the axis 166 when the lever 160 is in the BRAKE-OFF position, and is located at the lower side of the plane when the lever is in the BRAKE-ON position.

A lever arm 190 is secured to the mounting portion 164 of the parking brake actuating lever 160 intermediate the opposite ends thereof. An upper portion 192 of the brake push-pull rod assembly 42 is connected to this lever arm through a pivot joint 194. A lower portion 196 depends through the adapter bore 102 and generally along the axis 30 and since the upper portion is slightly inclined with respect to the lower portion, another ball and socket joint 198 is used to connect them. One or more elastomeric or plastic guide rings 200 can be used, if desired, to guide the lower portion 196 within the adapter bore or within the lower tubular portion 66 for concentricity with the axis 30. The distal end of the lower portion 196 is connected to the parking brake selector spool 41, which can be arranged concentrically along central axis 30, if desired.

Figure 6:
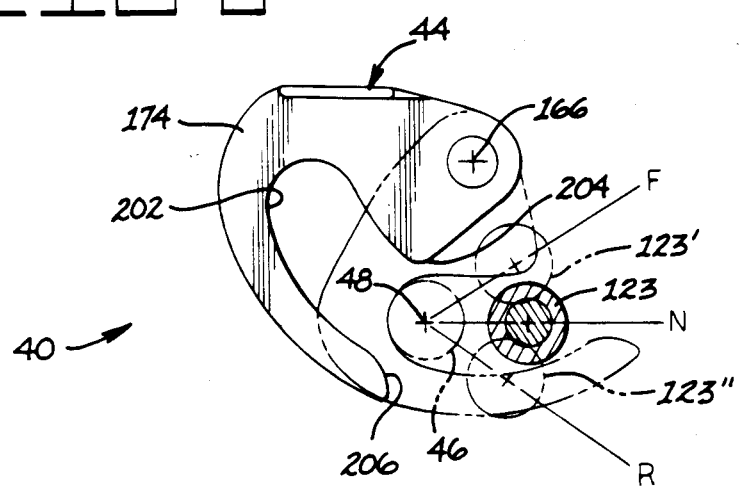
FIG. 6 is a diagrammatic view of the neutralizing member shown in FIG. 4 in an elevated BRAKE-OFF condition in solid lines and in a lowered BRAKE-ON condition in phantom lines.

Referring to FIGS. 4 and 6, the neutralizing member 44 of the brake and neutralizer device 40 includes a generally C-shaped cam plate 174 which is profiled to define an arcuate slot 202 and a pair of contoured entry ramps 204 and 206 at the opposite sides of the slot which cooperate with the cylindrical ring 123 on the projection 122 of the directional actuating member 108 as will later be explained.

Figure 8:
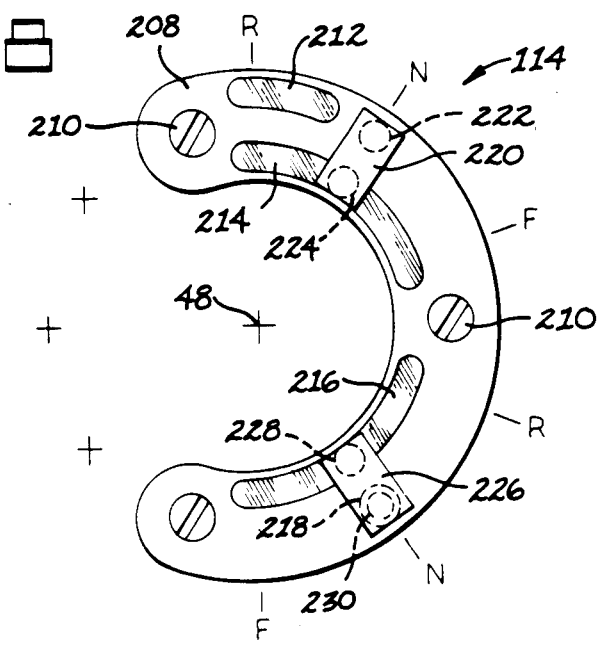
FIG. 8 is a diagrammatic view of the electrical switch portion as taken along line VIII—VIII of FIG. 7.

Turning next to the construction of the electrical switch assembly 114 shown in FIGS. 7 and 8, it includes an arcuately shaped circuit board 208 releasably secured to the pedestal element 54 by a plurality of screws 210. The circuit board is preferably of a nonconducting plastic material and has first, second, third and fourth electrically conducting portions 212, 214, 216 and 218 on the outer surface thereof. A wiring harness or electrical cable assembly 219 has four electrically conducting wires, not shown, that are individually connected to the four electrically conducting portions. A first or upper wiper bridge 220 rotates about the axis 48 since it is contained within the swingable actuating member 108. The electrically conductive upper wire bridge 220 is biased by the piston 118 and the compression spring 120 toward the circuit board, and has two inwardly projecting buttons 222 and 224. The upper wiper bridge 220 thus cooperates with the upper pair of conducting portions 212 and 214. A second or lower wiper bridge 226 is similar to the upper wiper bridge 220 and has a pair of inwardly projecting buttons 228 and 230 that cooperate with the lower pair of conducting portions 216 and 218.

Alternate Embodiment

Figure 10:
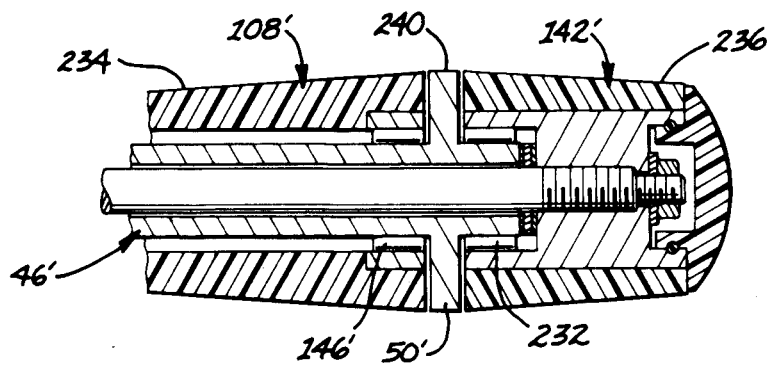
FIG. 10 is an enlarged, fragmentary sectionalized view through an alternate embodiment of the tiller arm, directional actuating member and speed actuating member shown in FIG. 1.
Figure 11:
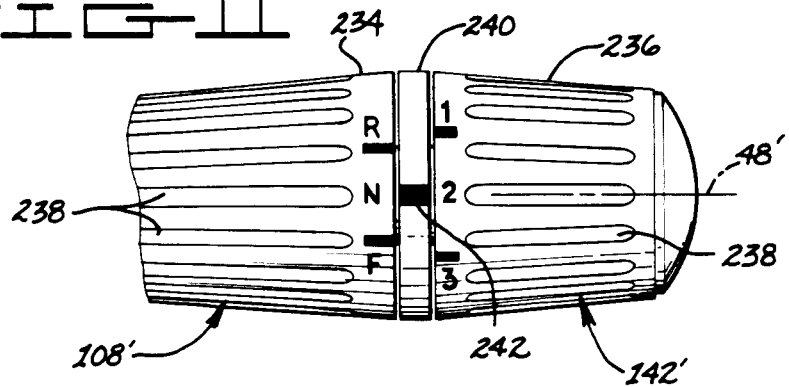
FIG. 11 is a fragmentary, external view of the alternate embodiment shown in FIG. 10 illustrating the indicia used therewith.

Referring to FIGS. 10 and 11, an alternate embodiment tiller arm 46' is illustrated with a directional actuating member 108' and a speed actuating member 142' supportably mounted thereon by a needle or sleeve bearing 146' and a needle or sleeve bearing 232 respectively. The actuating members have generally elongate external conical surfaces 234 and 236 suitably knurled or provided with elongate grooves 238 to aid in gripping them. The flange 50' of the tiller arm has an external cylindrical surface 240 that is marked with a reference mark 242. The directional actuating member has directional indicia R,N and F on the surface 234 that are selectively positionable with respect to the "stationary" reference mark 242, and the speed actuating member has speed range indicia 1,2 and 3 on the surface 236 that are selectively positionable with respect to the reference mark.

Industrial Applicability

The operator's left hand palm can face downwardly and rest comfortably about the directional actuating member 108 shown in FIG. 1. It is an easy motion to rotate it in a clockwise direction when looking inwardly along the axis 48 to the FORWARD mode from the NEUTRAL position of the projection 122 shown in FIG. 3, or in a counterclockwise direction to the REVERSE mode from the NEUTRAL position. The angular movement identified by the letter C is approximately 35° in each instance. When the projection is in the FORWARD mode, the ball and socket joint 126,128 shown in FIG. 1 is elevated and this raises the elongate cable 130 connected to the directional selector spool 33 and pulls it outwardly of the second hydraulic control valve device 35. When the projection is lowered for the REVERSE mode, the cable 130 is pushed to retract the directional selector spool. It should be appreciated that the lower end of the cable extends through a curved path to the directional selector spool which could be at almost any angular orientation.

The speed actuating member 142 is typically located in FIRST GEAR and may be rotated therefrom in even increments in a clockwise direction when viewing inwardly along the axis 48 of FIG. 1 to the SECOND GEAR and THIRD GEAR positions. With such rotation of the speed actuating member, the radius arm 147 illustrated in FIG. 4 is moved in a counterclockwise position. This elevates the cable 152 and pulls the speed selector spool 37 outwardly of the third hydraulic control device 39. The cable 152 also is curved at its lower end and is somewhat parallel to the cable 130, although FIG. 1 is diagrammatically inaccurate in this respect, since the control valves 35 and 39 are preferably juxtaposed as is indicated in FIG. 9.

During straight longitudinal movement of the track-type vehicle 14, the tubular tiller arm 46, and the housing assembly 56 are positioned in the NEUTRAL position identified by the letter "N" in FIG. 2. The NEUTRAL position is located at an angle B of about 15° forward of a transverse vertical plane through the upstanding axis 30. If it is desired to steer the vehicle to the left when travelling forwardly, the tiller arm is urged forwardly or in a counterclockwise direction about upstanding axis 30. Advantageously, the vehicle rotates or changes its steering heading in the same direction that the tiller arm is swung about the axis 30. This causes the corresponding angular movement of the housing assembly 56 on the ball bearing assembly 80 and the output lever arm 28 shown near the bottom of FIG. 1. The counterclockwise movement of the output lever arm 28 pulls the steering selector spool 29 outwardly of the first hydraulic control device 31 through any intermediate and conventional coupling means 49 as indicated by the broken lines. The steering motor 47 is then caused to operate in the desired direction and at the desired rate of speed such that the right output member 19 of the cross drive mechanism 15 of FIG. 9 is accelerated and the left output member 17 is decelerated by approximately the same amount. The vehicle is subsequently caused to rotate in a counterclockwise direction about its own central vertical axis and to turn to the left. Of course, the clockwise movement of the tiller arm will correspondingly urge the steering selector spool 29 inwardly to cause clockwise rotation of the vehicle and a right turn when traveling forwardly. When the direction of longitudinal travel is changed to reverse, the forward displacement of the tiller arm 46 will still cause counterclockwise rotation of the vehicle about its own central vertical axis. Both the full counterclockwise and full clockwise vehicle turning positions, identified respectively by the letters "CCW" and "CW" are located at an angle A of about 25° from the neutral position. As is shown in FIG. 1, the steering arm axis 48 is inclined upwardly at an angle D of about 15° for comfort, since the forearm and wrist are more relaxed thereat than would be the case with a horizontal steering arm axis.

One of the features of the control mechanism 10 is that both of the push-pull cable assemblies 34 and 38 are guidably centered by the ball bearing assemblies 136 and 158 at a fixed radius away from the central upstanding axis 30. Thus, when the housing assembly 56 is rotated in either direction away from NEUTRAL during steering, the cable assemblies 136 and 58 are individually allowed to rotate about their own axes 100 and 98. Permitting them to freely rotate relative to the housing assembly automatically relieves any twisting strains thereon since the lower ends of the cable assemblies 34 and 38 are positively connected to the frame-supported directional and speed selector spools 33 and 37 respectively. If these cable assemblies were not allowed to freely rotate, there would be a tendency for them to twist and cause an undesirable increase in resilient torque acting against the swinging movement of the steering selector apparatus 26 about its upstanding axis 30.

Referring now to the brake and neutralizer device 40 shown in FIGS. 1 and 4, the parking brake actuating lever 160 may be urged forwardly by the operator's left hand from the solid line BRAKE-OFF position to the phantom line BRAKE-ON position. In so doing, the mounting portion 164, the sleeve 170 and the lever arm 190 are rotated in a counterclockwise direction about the axis 166 when viewing FIG. 4. In doing this, the pivot pin 180 is moved in an arc about the axis 166 from a location at the upper side of the plane 188 to the lower side of that plane. The compression spring 186 is gradually compressed until the pivot pin passes through the plane, and thereafter the compression spring expands and positively urges the lever toward the BRAKE-ON position with a desirable over-center action. The pivot joint 194 and third push-pull rod assembly 42 are subsequently urged downwardly and the parking brake selector spool 41 is pushed into the fourth hydraulic control valve device 43 to simultaneously engage the left and right parking brakes 25 and 27 of the vehicle, shown in FIG. 9.

When the parking brake actuating lever 160 is moved to the forward BRAKE-ON position, the profiled cam plate 174 is also caused to move in a counterclockwise direction when viewing FIGS. 4 and 6. In the event that the operator had positioned the directional actuating member 108 in FORWARD wherein the cylindrical projection 122 and ring 123 are arcuately disposed in an elevated position, the cam plate 174 would contact the ring and urge it downwardly. Specifically, as is shown in FIG. 6, the inner entry ramp 204 would contact the elevated ring as indicated in phantom lines by the reference number 123' and forcibly depress it to the solid line position illustrated. In a similar manner, if the operator had earlier positioned the directional actuating member 108 in REVERSE, the ring 123 would be in a lowered position as indicated in phantom lines by the reference number 123'. The subsequent counterclockwise movement of the neutralizing member 44 and cam plate 174 would cause the outer entry ramp 206 to abut the ring and to urge it upwardly toward its neutral position shown in solid lines. The arcuate slot allows the cam plate to avoid contact with the tubular tiller arm 46 until the desired amount of travel is provided for the third push-pull rod assembly 42.

The electrical switch assembly 114 illustrated in FIGS. 7 and 8 prevents inadvertent starting of the vehicle 14 with the transmission 15 in an active gear mode by requiring that the directional actuating member 108 be positively positioned in NEUTRAL. In this position the projection 122 is located centrally of the slot 124 as is illustrated in FIGS. 1 and 3. In such angular location, the lower wiper bridge 226 electrically bridges the third and fourth electrically conducting portions 216 and 218. Electrical energy is thus allowed to be conducted by the wiring harness 219 to an external electrical control circuit, not shown, for starting the engine 11. If the directional actuating member 108 is in the FORWARD mode, the wiper bridge 226 is located at the 6 o'clock position when viewing FIG. 8, and if the directional actuating member is in the REVERSE mode, the wiper bridge 226 is located approximately at the 4 o'clock position. In either of these locations the wiper bridge is displaced away from the fourth electrically conducting portion 218, and this effectively prevents electricity from passing through the lower wiper bridge and prevents inadvertently starting of the vehicle with the transmission in either FORWARD or REVERSE.

Assuming that the engine is started and running, the directional actuating member 108 can be rotated from NEUTRAL to REVERSE. As can be appreciated by reference to FIG. 8, the upper wiper bridge 220 is simultaneously moved about the axis 48 from the position illustrated wherein no electricity is conducted therethrough. After a relatively limited angular degree of movement, the button 222 makes electrical contact with the first electrically conducting portion 212. Accordingly, electrical energy is communicated across the upper wiper bridge and through the wiring harness 219 to actuate a warning horn, not shown. This signal alerts those around the vehicle that it is or is about the be backing up.

In view of the foregoing, it can be appreciated that the operator's left hand efficiently controls the mechanical displacement of four different selector spools 29,33,37 and 41 by the manipulation of the control mechanism 10 through relatively simple and economical push-pull controls 34,38 and 42 and a rotating housing assembly 56. The operator's left hand can be easily positioned over the directional actuating member 108 or 108' and the wrist limitedly rotated in a clockwise direction when looking inwardly along the axis 48 to obtain one of the REVERSE, NEUTRAL or FORWARD modes, or over the juxtaposed speed actuating member 142 or 142' and the wrist twisted to obtain one of the FIRST, SECOND or THIRD SPEED modes. In either case, the operator's left arm may be simultaneously extended or retracted to rotate the tiller arm 46 and the housing assembly 56 about the upstanding axis 30 to steer the vehicle in the desired direction. Moreover, the operator can conveniently reposition his left hand from either of these actuating members to the parking brake actuating lever 160 to urge it forwardly to the BRAKE-ON mode when he is through the work task. This movement will cause the directional actuating member 108 of the first actuator device 32 to be automatically placed into the NEUTRAL mode in the event that it was inadvertently left in either FORWARD or REVERSE. This will minimize use of the parking brakes as service brakes and extend the service life thereof, and should the parking brake actuating lever be immediately returned to the BRAKE-OFF mode will prevent inadvertent movement of the vehicle in a positive drive mode. In this regard it should be noted that the vehicle 14 has conventional left and right service brakes, not shown, in operational relationship with the left and right output members 17 and 19 of the cross drive mechanism 15 in a well known manner. Since the engine 11 is frequently turned off when the parking brakes 25 and 27 are in the BRAKE-ON mode, the restarting of the power plant can be established only in the NEUTRAL position of the directional actuating member 108 by the electrical switch assembly 114, and this is also advantageous.

Other aspects, objects and advantages will become apparent from a study of the specification, drawings and appended claims.

We claim:

1. A control mechanism for operating a vehicle having an element mounted on the vehicle for swinging movement about an upstanding first axis, and a tiller arm extending outwardly from the element along a second axis and controlling steering of the vehicle by swinging the element about the first axis, comprising:
   first actuator means for controlling the direction of longitudinal movement of the vehicle including a directional actuating member; and
   second actuator means for controlling the speed range of the vehicle including a speed actuating member, the directional and speed actuating members being arranged on the tiller arm for independent rotation about the second axis.

2. A control mechanism for operating a vehicle having an element mounted on the vehicle for swinging movement about an upstanding first axis, and a tiller arm extending outwardly from the element along a second axis and controlling steering of the vehicle by swinging the element about the first axis, comprising:
   first actuator means for controlling the direction of longitudinal movement of the vehicle including a directional actuating member rotatably connected to the tiller arm; and
   second actuator means for controlling the speed range of the vehicle including a speed actuating member rotatably connected to the tiller arm.

3. The control mechanism of claim 2 wherein the directional actuating member is tubular and externally mounted on the tiller arm.

4. The control mechanism of claim 3 wherein the second actuating means includes a shaft rotatably mounted within the tiller arm and the speed actuating member is connected to the shaft.

5. The control mechanism of claim 2 wherein the element includes a housing assembly, and the first actuator means includes a first push-pull control and a first bearing assembly for guidably supporting the first push-pull control within the housing assembly on a third axis radially offset from the first axis.

6. The control mechanism of claim 5 wherein the second actuator means includes a second push-pull control and a second bearing assembly for guidably supporting the second push-pull control within the housing assembly on a fourth axis radially offset from the first axis.

7. The control mechanism of claim 6 wherein the first actuator means includes first coupling means for connecting the directional actuating member to the first push-pull control, the second actuator means includes second coupling means for connecting the speed actuating member to the second push-pull control, the directional actuating member and the speed actuating member being substantially juxtaposed concentrically along the second axis.

8. A control mechanism for operating a vehicle comprising:
   a housing assembly;
   support means for mounting the housing assembly on the vehicle for swinging movement about an upstanding first axis;
   a tiller arm extending outwardly from the housing assembly along a second axis;
   a first actuating member connected to the tiller arm and controlling the direction of longitudinal movement of the vehicle; and
   a second actuating member connected to the tiller arm and controlling the speed range of the vehicle, the first and second actuating members being substantially juxtaposed on the tiller arm for individual rotation about the second axis.

9. The control mechanism of claim 8 including first and second push-pull controls dependingly arranged within the housing assembly, and first and second coupling means for respectively connecting the first and second actuating members to the first and second push-pull controls.

10. The control mechanism of claim 9 including bearing assembly means for respectively guidably supporting the first and second push-pull controls within the housing assembly along axes offset from the first axis.

11. A control mechanism for operating a vehicle comprising:
    a housing assembly;
    support means for mounting the housing assembly on the vehicle for swinging movement about an upstanding first axis;
    a tiller arm extending outwardly from the housing assembly along a second axis;
    a first actuating member rotatably connected to the tiller arm for movement from a central neutral position to one of a forward position and a reverse position and controlling the direction of longitudinal movement of the vehicle;
    a shaft rotatably mounted within the tiller arm; and
    a second actuating member connected to the shaft for movement between a plurality of speed positions and controlling the speed range of the vehicle.

12. The control mechanism of claim 11 including a directional selector spool, a speed selector spool, and first coupling means for connecting the first actuating member to the directional selector spool and second coupling means for connecting the second actuating member to the speed selector spool.

13. The control mechanism of claim 12 wherein the first coupling means includes a first push-pull cable assembly and the second coupling means includes a second push-pull cable assembly dependingly arranged within the housing assembly.

14. The control mechanism of claim 11 wherein the control mechanism includes electrical means on the tiller arm for initiating a warning signal in response to rotating the first actuating member to the reverse position.

15. The control mechanism of claim 11 wherein the control mechanism includes electrical means on the tiller arm for allowing the vehicle to be started solely when the first actuating member is rotatably disposed in the neutral position.

16. A control mechanism for operating a vehicle comprising:

a housing assembly;

first support means for mounting the housing assembly on the vehicle for swinging movement about an upstanding first axis;

an actuating member;

second support means for mounting the actuating member on the housing assembly for limited rotation about a second axis;

control means including a push-pull control for mechanically changing one of the direction and the speed range of the vehicle;

coupling means for connecting the push-pull control to the actuating member; and bearing assembly means for guidably supporting and permitting relative angularly movement of the push-pull control within the housing assembly about a third axis radially offset from the first axis when the housing assembly is swung.

17. The control mechanism of claim 16 wherein the push-pull control is a cable assembly dependingly arranged within the housing assembly for selecting one of forward, neutral, and reverse positions.

18. The control mechanism of claim 17 including another actuating member mounted on the housing assembly for limited rotation about the second axis by the second support means, and wherein the control means includes another push-pull cable assembly connected to the another actuating member and dependingly arranged within the housing assembly for selecting one of first speed, second speed, and third speed positions.

19. The control mechanism of claim 18 wherein the respective push-pull cable assemblies are generally diametrically oppositely disposed, and the control mechanism includes a further push-pull control arranged centrally along the first axis.

* * * * *